United States Patent
Dobler et al.

(10) Patent No.: US 7,274,287 B2
(45) Date of Patent: Sep. 25, 2007

(54) WARNING AND INFORMATION SYSTEM FOR A VEHICLE

(75) Inventors: Guenter Dobler, Altbach (DE); Wilhelm Kincses, Titisee-Neustadt (DE); Siegfried Rothe, Denkendorf (DE); Michael Schrauf, Esslingen (DE); Sven Willmann, Titisee-Neustadt (DE)

(73) Assignee: DaimlerChrysler AG, Stuttgart (DE)

( * ) Notice: Subject to any disclaimer, the term of this patent is extended or adjusted under 35 U.S.C. 154(b) by 154 days.

(21) Appl. No.: 11/092,671

(22) Filed: Mar. 30, 2005

(65) Prior Publication Data
US 2005/0219041 A1    Oct. 6, 2005

(30) Foreign Application Priority Data
Mar. 31, 2004  (DE) .................. 10 2004 015 671

(51) Int. Cl.
*B60Q 1/00*  (2006.01)
*B60Q 1/22*  (2006.01)
*G08G 1/00*  (2006.01)
*G08F 17/10* (2006.01)

(52) U.S. Cl. .................... 340/425.5; 340/435; 340/436; 340/438; 340/439; 340/461; 340/463; 340/901; 701/300; 701/301; 701/302

(58) Field of Classification Search ........ 340/435–439, 340/575–576, 425.5, 691.1, 691.6, 457–459, 340/903, 461–463, 901; 701/300–302
See application file for complete search history.

(56) References Cited

U.S. PATENT DOCUMENTS

| | | | |
|---|---|---|---|
| 6,097,285 A * | 8/2000 | Curtin ................. | 340/436 |
| 6,433,679 B1 * | 8/2002 | Schmid ............... | 340/435 |
| 6,525,656 B1 * | 2/2003 | Hahn .................. | 340/463 |
| 6,650,251 B2 * | 11/2003 | Gerrity .............. | 340/963 |
| 6,774,772 B2 * | 8/2004 | Hahn .................. | 340/439 |
| 6,876,298 B2 * | 4/2005 | Litkouhi et al. ...... | 340/435 |
| 6,876,307 B1 * | 4/2005 | Spitzer et al. ....... | 340/691.6 |
| 6,914,521 B2 * | 7/2005 | Rothkop .............. | 340/425.5 |
| 7,049,945 B2 * | 5/2006 | Breed et al. ......... | 340/435 |

FOREIGN PATENT DOCUMENTS

DE        199 52 506 C1     10/1999

* cited by examiner

*Primary Examiner*—Benjamin C. Lee
*Assistant Examiner*—Lam Pham
(74) *Attorney, Agent, or Firm*—Crowell & Moring LLP

(57) ABSTRACT

A warning and information system for a motor vehicle which outputs information that is below a conscious threshold of perception of a use, and above his or her unconscious threshold. At least one signal source located in the peripheral field of vision of the user is provided, and its output signals are variable by adjusting their color, intensity, frequency, timber, and/or loudness.

15 Claims, 1 Drawing Sheet

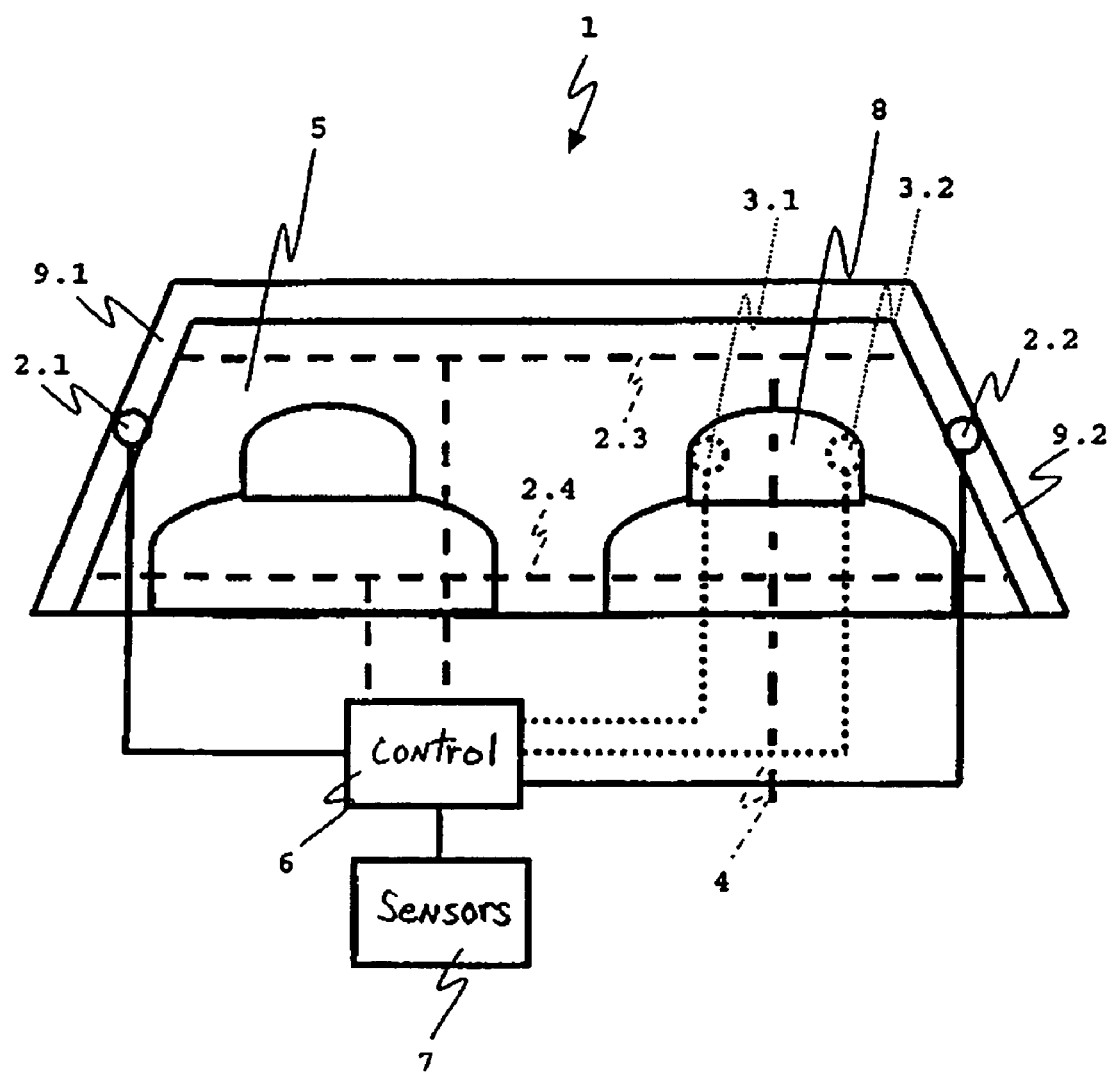

WARNING AND INFORMATION SYSTEM FOR A VEHICLE

BACKGROUND AND SUMMARY OF THE INVENTION

This application claims the priority of German patent document 10 2004 015 671.9, filed Mar. 31, 2004, the disclosure of which is expressly incorporated by reference herein.

The present invention relates to a warning and information system for a motor vehicle.

Modern warning and information systems should warn the vehicle driver of hazardous situations which previously had to be recognized by the driver alone. For example, some complex ambient detection systems based on radar, infrared and/or image processing technologies have been implemented in the applicant's S-class motor vehicles, where these technologies support the longitudinal and/or transverse guidance of the vehicle through visual and/or acoustic information output.

Such warning and information systems are usually designed so that there is a warning of a hazard only when it is to be assumed that the driver has not perceived this hazard himself because otherwise the acceptance and efficacy of the warning information would be lost. With many warning systems, however, it is difficult to define a suitable point in time for the warning. First, the warning must be made early enough to ensure that the driver of the vehicle will be able to reliably handle the hazardous situation if he had not recognized it previously. Secondly, the warning should not be issued so early that a vehicle driver who has already recognized the risk and intends to respond accordingly is unnecessarily disturbed or distracted. Warning signals that are too early and/or too frequent may result in the operator's paying less attention to them over time, and important information will be lost.

German patent document DE 199 52 506 C1 solves this problem with a system for supporting an operator of a technical facility which displays information in the form of images or symbols at least once for a brief period of time in the primary field of vision of the operator, the period of time being below a conscious threshold of perception by the user and above an unconscious threshold of perception.

One object of this invention is to provide a warning and information system for a vehicle which will increase traffic reliability and support the driver of the vehicle in particular in his longitudinal and transverse guidance tasks.

This and other objects and advantages are achieved by the warning and information system according to the invention, which comprises at least one signal source located in the user's peripheral field of vision, whose output signals are variable by adjusting the color, intensity, frequency, timber or loudness. Since the signals are generated in the user's peripheral field of vision, more installation room in the primary field of vision of the user is available for other information tasks above a conscious threshold of perception. By varying the color, intensity, frequency, timber, or loudness of the output signals of the signal source, these output signals may be adapted to the particular situation, and corresponding actions and responses of the driver of the vehicle are prepared, thereby increasing traffic safety in an advantageous manner.

By using output signals that are below a conscious threshold of perception of the user, and above an unconscious threshold of perception, the user perceives the information on a subthreshold level without diverting his attention, and is therefore less distracted from the traffic situation. At the same time, the driver of the vehicle is prepared for reactions and/or actions that will be necessary subsequently, so that his reaction time until performing these subsequent actions is reduced. This is based on the finding that information which is made available for such a short period of time, for example, that it cannot be perceived consciously but is made available for such a long period of time that it is nevertheless perceived by the person unconsciously, is perceived at a subthreshold level and therefore affects his perception and/or behavior. By shortening the response time, it is possible in an advantageous manner to have a later output of the corresponding information for prompting a certain action and/or reaction in the conscious range of perception, so that more time is available to review the information output and reduce the incidence of false output in the conscious perception range. This increases the acceptance of such a warning and information system.

In one embodiment of the warning and information system according to the invention, an analyzer and control unit is provided to analyze signals from a sensor system and trigger and adjust the at least one signal source so that a stereo effect is obtained with directionally encoded signals. The sensor system in the vehicle may be, for example, longitudinal guidance support systems and/or lane-keeping support systems based on radar, infrared and/or image processing technologies.

In another embodiment of the invention, the at least one signal source also emits output signals above the conscious perception threshold. By combining consciously perceptible information with unconsciously perceived information it is possible to reduce further the response time of the driver of the vehicle.

The at least one signal source is designed, for example, as a light source and/or as a noise source. The output signals of these signal sources may be combined in any manner. For example, visual output signals in the conscious perception range and acoustic output signals in the subthreshold perception range may be emitted and vice versa. Furthermore, it is possible to combine visual and acoustic output signals in the subthreshold perception range with visual or acoustic output signals in the conscious perception range and/or visual or acoustic output signals in the subthreshold perception range with visual and acoustic output signals in the conscious perception range to shorten the response time of the driver of the vehicle.

In another embodiment of the warning and information system, the at least one light source emits electromagnetic radiation, e.g., light in the visible and/or invisible wavelength range.

In another embodiment of the warning and information system, the at least one sound source emits acoustic signals in the audible and/or inaudible wavelength range, in particular in the infrasonic range, comprising frequencies below 20 Hz.

In an advantageous embodiment of the warning and information system, a first light source is provided in the left peripheral field of vision of the user (e.g., in the left A-pillar) and a second light source is provided in the right peripheral field of vision of the user (e.g., in a right A-pillar). Additionally or alternatively, multiple light sources may also be provided as a light strip in an upper and/or lower and/or right and/or left area of a windshield.

The at least one sound source may be integrated into a head restraint, for example, and/or may be part of an audio system.

In an embodiment of the warning and information system, the at least one signal source generates warning signals to support the driver of the vehicle in transverse guidance of the vehicle.

Additionally or alternatively, the at least one signal source generates warning signals to support the driver of the vehicle in longitudinal guidance of the vehicle.

These and other features are derived not only from the claims but also from the description and the drawings, whereby the individual features may be implemented separately or together in the form of subcombinations in an embodiment of the invention and in other fields and may constitute advantageous embodiments.

Other objects, advantages and novel features of the present invention will become apparent from the following detailed description of the invention when considered in conjunction with the accompanying drawings.

BRIEF DESCRIPTION OF THE DRAWINGS

The single FIGURE shows a schematic diagram of an exemplary embodiment of a warning and information system for a motor vehicle.

DESCRIPTION OF THE DRAWINGS

As depicted in the FIGURE, an embodiment of a warning and information system 1 for a vehicle comprises multiple signal sources 2.1 through 2.4, 3.1, 3.2 arranged in the peripheral field of vision of the user, an analyzer and control unit 6 and a vehicle sensor system 7, which may include multiple vehicle assistance systems.

A first and a second of the signal sources depicted here are designed as light sources 2.1, 2.2, the first light source 2.1 being provided in a left A-pillar 9.1 of the vehicle, and thus in the left peripheral field of vision of the user, and a second light source 2.2 being provided in the right A-pillar 9.2 of the vehicle, and thus in the right peripheral field of vision of the user. The position of the driver of the vehicle is represented by a dash-dot line 4 in the FIGURE. Additional signal sources (in the form of light sources) are combined into light strips 2.3, 2.4 depicted with dotted lines. The first light strip 2.3 is arranged in the upper area of a windshield 5 (e.g., in an interior mirror) and a second light strip 2.4 is arranged in the lower area of the windshield 5. The light sources each emit electromagnetic radiation (e.g., light in the visible and/or invisible wavelength range) depending on the triggering by the analyzer and control unit 6.

Two other signal sources are designed as sound sources 3.1, 3.2 (depicted as dotted lines) arranged in a head restraint 8 of a driver's seat in the exemplary embodiment depicted here. These sound sources 3.1, 3.2 and others (not shown) may also be designed as part of a loudspeaker system for an audio system. The sound sources each emit acoustic signals in the audible frequency range (e.g., 16 Hz to 20 Hz) and/or in the inaudible (e.g., ultrasonic) range which includes frequencies greater than 20 kHz and/or in the infrasonic range including frequencies below 16 Hz, depending on the triggering by the analyzer and control unit 6.

The signals emitted by the signal sources 2.1 through 3.2 are below a conscious threshold of perception by the user and above an unconscious threshold of perception and can be varied by the analyzer and control unit 6 by adjusting their color, intensity, frequency, timber and/or loudness. In addition, the output signals in the subthreshold range of perception may be combined with output signals in the conscious range of perception in any desired manner to further shorten the response time.

In the exemplary embodiment depicted here, the signals output by signal sources 2.1 through 2.4, 3.1, 3.2 are preferably used as warning signals to support the driver of the vehicle in transverse guidance and/or lateral guidance of the vehicle.

The inventive warning and information system 1 is not limited to the arrangement depicted in the FIGURE. For example, an embodiment in which only the first and second light sources 2.1 and 2.2 are used for information output is also conceivable, or an embodiment in which only the first and second noise sources 3.1, 3.2 are used for information output or an embodiment in which the first and second light sources 2.1, 2.2 and the sound sources integrated into the loudspeaker system of the audio system are used for information output, etc., is possible.

The functioning of the inventive warning and information system 1 is described below.

The analyzer and control unit 6 analyzes signals of the vehicle's sensor system 7 which preferably includes systems for longitudinal and/or lane-keeping support for the driver of the vehicle. Such systems include sensors for detection of the environment on the basis of radar and/or infrared and/or image processing technologies.

In longitudinal guidance support systems, the driver of the vehicle is supported in his job of driving the vehicle (e.g., by automatic braking interventions up to 3 m/s$^2$, and/or the driver is informed or warned visually and/or acoustically to prompt him to brake in the event of inadequate system interventions. With lane-keeping support systems (e.g., in a lane assistant system), the driver is informed and/or warned acoustically and/or visually to prompt him to take the proper steering action.

If, based on the signals of the sensor system 7, the analyzer and control unit 6 detects that the driver of the vehicle must be prepared for a certain action and/or reaction (e.g., a braking operation or a steering operation), then the analyzer and control unit 6 triggers the at least one signal source 2.1 through 3.2 so as to yield a stereo effect with directionally encoded signals. By varying the color, intensity, frequency, or sound color, and/or loudness of the output signals of the signal sources 2.1 through 3.2, the output signals of the signal sources 2.1 through 3.2 can be adapted to the particular situation. Thus for example the light sources 2.1 through 2.4 may output light as a continuous light and/or as a flashing light and/or as flashes of light in the visible and/or invisible wavelength range and through the sound sources 3.1, 3.2, tones and/or sounds and/or tone sequences in the audible and/or inaudible wavelength range may be output.

To generate warning signals for staying in the proper lane, in particular in construction sites on highways, the analyzer and control unit 6 triggers the two light sources 2.1 and 2.2 in the A-pillars 9.1, 9.2 or the two light strips 2.3 and 2.4 in the windshield 5 so that a suitable visual stereo warning signal is emitted. Directionally encoded signals are generated for example by activating only the right or left light sources 2.1, 2.2 or adjusting the light sources 2.1 through 2.4 to be right-weighted or left-weighted. Left-weighted means that the light sources 2.1 on the left side of the vehicle are triggered to a greater extent or with a higher intensity and right-weighted means that the light sources 2.2 on the right side of the vehicle are triggered more frequently or with a higher intensity. Through these measures, as in acoustics, a stereo effect is achieved from which the driver of the vehicle can derive any position, such as right, left, central, etc.

Similarly, the sound sources 3.1 and 3.2 integrated into the head restraints 8 or into the loudspeaker system may be triggered by the analyzer and control unit 6 to generate acoustic warning signals for staying in the lane. The acoustic warning signals may be generated in the audible wavelength range, but may also be generated in the inaudible wavelength range. Due to the stereo-based tones, sounds or tone sequences thus generated, the driver of the vehicle is informed and/or his response is influenced by these warnings.

To generate warning signals for longitudinal guidance support, the analyzer and control unit 6 may briefly trigger all light sources 2.1 through 2.4, e.g., when the distance from the vehicle traveling in front falls briefly below a threshold level and simultaneously to warn the driver of the vehicle, in which case the intensity, color and frequency of the light emitted may be adapted to the situation. Additionally or alternatively, the analyzer and control unit may trigger the sound sources 3.1, 3.2 to generate corresponding acoustic warning signals in the audible and inaudible ranges and in the borderline range between the two, where the frequency, timber and/or loudness of the acoustic warning signals emitted may be adapted to the particular situation.

The signals described here trigger correct actions and responses on the part of the driver of the vehicle, i.e., responses adapted to the particular situation and thus increase traffic safety.

In addition, through a change in color of the light sources, pulsating light or light that is inserted for an extended period of time or image overlays, it is possible to transmit information such as traffic light functions, time information, traffic and environment information, ambient information and vehicle information.

Through a corresponding arrangement of the signal sources 2.1 through 3.2 and a corresponding triggering, the analyzer and control unit 6 may adapt the warning and information system 1 described here to any seat position in the vehicle.

By varying the color, intensity, frequency, timber and/or loudness of the output signals which are below a conscious threshold of perception by the user and above an unconscious threshold of perception, of the at least one signal source located in the peripheral field of vision of the user, these output signals may be adapted to the particular situation, and may prompt appropriate actions and responses on the part of the driver of the vehicle, in particular for longitudinal and/or transverse guidance of the vehicle, so that the response time is reduced and traffic safety is increased in an advantageous manner.

Due to the reduction in response time, it is possible in an advantageous manner to output the corresponding information for prompting a certain response and/or action at a later point in time in the conscious perception range so that more time is available to review the information to be output and reduce the rate of false outputs in the conscious perception range. This increases the acceptance of such a warning and information system in a vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A warning and information system for a motor vehicle, said system comprising means for outputting information that is below a conscious threshold of perception of a user and above an unconscious threshold of perception wherein:
    at least one signal source is located in a peripheral field of vision of the user; and
    output signals of said at least one signal source are variable by adjusting at least one of their color, intensity, frequency, timber, and loudness; and
    wherein the system also comprises an analyzer and control unit which:
    analyzes signals from a sensor system;
    triggers the at least one signal source; and
    adjusts the at least one signal source so as to yield a stereo effect with directionally encoded signals.

2. The warning and information system as claimed in claim 1, wherein the at least one signal source comprises a light source which emits light at least in the invisible wavelength range.

3. The warning and information system as claimed in claim 1, wherein the at least one signal source comprises a sound source; and wherein the at least one sound source emits acoustic signals at least in the inaudible wavelength range.

4. The warning and information system as claimed in claim 1, wherein the at least one signal source comprises a light source; and wherein a first light source is situated in the left peripheral field of vision of the user; and
    a second light source is situated in the right peripheral field of vision of the user.

5. The warning and information system as claimed in claim 1, wherein the at least one signal source comprises a light source; wherein multiple light sources are arranged as a light strip in an upper area of a windshield.

6. The warning and information system as claimed in claim 1, wherein the at least one signal source comprises a light source; wherein multiple light sources are arranged as a light strip in a lower area of a windshield.

7. The warning and information system as claimed in claim 1, wherein the at least one signal source comprises a light source; wherein multiple light sources are arranged as a light strip in an upper and a lower area of a windshield.

8. The warning and information system as claimed in claim 1, wherein the at least one signal source comprises a sound source is integrated into a head restraint.

9. The warning and information system as claimed in claim 1, wherein the at least one signal source comprises a sound source which is part of an audio system.

10. The warning and information system as claimed in claim 1, wherein the at least one signal source comprises a sound source which is integrated into a head restraint and is part of an audio system.

11. The warning and information system as claimed in claim 1, wherein the at least one signal source generates warning signals for lane-keeping support of the vehicle.

12. The warning and information system as claimed in claim 1, wherein the at least one signal source generates warning signals for longitudinal guidance support of the vehicle.

13. The warning and information system according to claim 1, wherein:
    upon occurrence of a situation for which action by the user will be necessary subsequently, said control unit causes said at least one signal source to generate a first signal which provides information regarding said situation, said first signal being below a conscious threshold of perception and above an unconscious threshold of perception of said user; and at a later point in time, when a particular action by the user is necessary, said control unit causes said at least one signal source to generate a second signal for prompting said particular action by the user, said second signal containing information that corresponds to said information in said first signal and being above the conscious threshold of perception of the user, whereby a response time of said user to said second signal is diminished.

14. A warning and information system for a vehicle, said system comprising:

at least one signal source for outputting signals to a user of the vehicle; and a control unit; wherein, upon occurrence of a situation for which action by the user will be necessary subsequently, said control unit causes said at least one signal source to generate a first signal which provides information regarding said situation, said first signal being below a conscious threshold of perception and above an unconscious threshold of perception of said user; and at a later point in time, when a particular action by the user is necessary, said control unit causes said at least one signal source to generate a second signal for prompting said particular action by the user, said second signal containing information that corresponds to said information in said first signal and being above the conscious threshold of perception of the user, whereby a response time of said user to said second signal is diminished.

15. A warning information system for a motor vehicle, comprising:

at least one signal source; and a control unit for causing said at least one signal source to generate a warning signal;

wherein said warning signal comprises one of (i) a combination of a visual signal in a conscious human perception range and an acoustic signal in a subthreshold human perception range, and (ii) a combination of a visual signal in the subthreshold human perception range and an acoustic signal in the conscious human perception range.

* * * * *